United States Patent [19]
Nafeh

[11] Patent Number: 5,343,251
[45] Date of Patent: Aug. 30, 1994

[54] METHOD AND APPARATUS FOR CLASSIFYING PATTERNS OF TELEVISION PROGRAMS AND COMMERCIALS BASED ON DISCERNING OF BROADCAST AUDIO AND VIDEO SIGNALS

[75] Inventor: John Nafeh, Portola Valley, Calif.

[73] Assignee: Pareto Partners, Inc., Portola Valley, Calif.

[21] Appl. No.: 62,458

[22] Filed: May 13, 1993

[51] Int. Cl.⁵ .................. H04N 5/76; H04N 5/91; H04N 5/222
[52] U.S. Cl. .................. 348/571; 348/907; 348/722; 358/908; 358/335; 360/69; 395/22
[58] Field of Search .................. 358/139, 10, 185, 160, 358/335, 311, 312, 310, 908; 360/27, 14.1, 33.1, 74.1, 71, 69; 455/67; 395/22, 21; 348/907, 722, 571, 5, 180; H04N 5/76, 5/91, 5/222

[56] References Cited
U.S. PATENT DOCUMENTS

| | | | |
|---|---|---|---|
| 3,182,724 | 8/1981 | Jagger | 358/139 |
| 4,504,851 | 3/1985 | Janko et al. | 358/10 |
| 4,520,404 | 5/1985 | Von Kohorn | 358/335 |
| 4,602,297 | 7/1986 | Reese | 360/14.1 |
| 4,750,052 | 6/1988 | Poppy et al. | 358/335 |
| 4,750,213 | 6/1988 | Novak | 358/139 |
| 4,752,834 | 6/1988 | Koombes | 358/335 |
| 4,782,401 | 11/1988 | Faerber | 358/335 |
| 4,879,611 | 11/1989 | Fukui et al. | 360/69 |
| 4,918,531 | 4/1990 | Johnson | 358/183 |
| 4,979,047 | 12/1990 | Wine | 358/335 |
| 5,103,431 | 4/1992 | Freeman et al. | 395/22 |
| 5,146,541 | 9/1992 | Speidel | 395/21 |
| 5,161,014 | 11/1992 | Pearson et al. | 358/160 |
| 5,165,069 | 11/1992 | Vitt et al. | 358/335 |

OTHER PUBLICATIONS

Giarratano, Joseph et al., "Future Impacts of Artificial Neural Systems on Industry", ISP Transactions vol. 29, No. 1 pp. 9–14. 1990.

Palmer, Douglas A., "Neural Networks: Computers that never need programming", I&CS Apr. 1988, pp. 75–77.

Primary Examiner—James J. Groody
Assistant Examiner—Safet Metjahic
Attorney, Agent, or Firm—Townsend and Townsend Khourie and Crew

[57] ABSTRACT

A method and apparatus for classifying patterns of television programs and commercials, based on learning and discerning of broadcast audio and video signals, wherein the signals might be incomplete and the number of discerning features is large. The apparatus uses a discerner device containing feature extraction, an artificial neural network and control mechanisms. The discerner device classifies signal patterns into classes and stores, records or displays them accordingly on different storage, recording or display devices using the appropriate control mechanisms. The method is operable for classifying many types of signal patterns, but most importantly, those patterns of programs and commercials of television broadcast audio and video signals.

21 Claims, 11 Drawing Sheets

METHOD AND APPARATUS FOR CLASSIFYING PATTERNS OF TELEVISION PROGRAMS AND COMMERCIALS BASED ON DISCERNING OF BROADCAST AUDIO AND VIDEO SIGNALS

The invention herein relates to a method and apparatus for signal pattern classification based on information contained in audio and video television broadcast signals. In particular, the invention relates to the distinguishing of such patterns of programs and commercials so that certain patterns can be retained and used while other patterns can be discarded.

BACKGROUND OF THE INVENTION

Certain systems for editing and controlling television broadcast signals have been described in several U.S. patents, especially editing of commercial messages from transmitted broadcast signals.

Prior work has used pre-determined mechanisms and conditions to edit and delete commercials. Such mechanisms include a trial and error mechanism to eliminate commercials using forward record and backward rewind control of video cassette records (VCRs), based on commercial interval length, as described in U.S. Pat. Nos. 4,782,834 (Koombes), 4,750,052 (Poppy et al.), 4,782,401 (Faerber), and 4,602,297 (Reese). Other mechanisms include preset timers for commercial message to avoid recording commercials on VCRs as described in U.S. Pat. Nos. 4,918,531 (Johnson), and 4,979,047 (Wine).

Pre-determined conditions include the transmission of encoded record and/or edit command signals from central stations to inhibit unwanted contents from being recorded or displayed as described in U.S. Pat. Nos. 4,520,404 (Kohorn), and 4,750,213 (Novak), superposing on the video signal a digitized code containing time-start information for program identification, as described in U.S. Pat. No. 4,879,611 (Fukui et al.), and other conditions such as deleting of color commercials in a monochrome program, as described in U.S. Pat. No. 4,283,735 (Jagger).

It would be of significant value to have a method and apparatus capable of classifying patterns in general, based on audio and video signal characteristics, without some or all of the above mentioned pre-determined mechanisms and conditions. Classifications can be done for several distinct patterns, including television programs and commercials, and the classification process could be done continuously. It would also be advantageous for the method to be similarly useful for classifying the patterns into classes to be stored, recorded or displayed in respective storage, recording or display devices.

SUMMARY OF THE INVENTION

The present invention is a method and apparatus to classify patterns of television programs and commercials using a device which can learn and discern television broadcast audio and video signals. The discerning device useful in this invention contains signal pre-processing and feature extraction, learning and classification, and control mechanisms. It will also have adaptive mechanisms to see through noise and distortion of signals. The discerning device may be applied in a variety of different manners, based on the objects to be classified.

The invention is intended to be useful in classifying many types of real-life signal patterns but, most importantly, programs and commercials based on various voice and image patterns, and generating the associated control commands based on the classification of the patterns at a continuous pace.

The invention has the advantages of classifying and selecting what is appropriate for each class.

DETAILED DESCRIPTION OF PREFERRED EMBODIMENTS

Figure 1A:
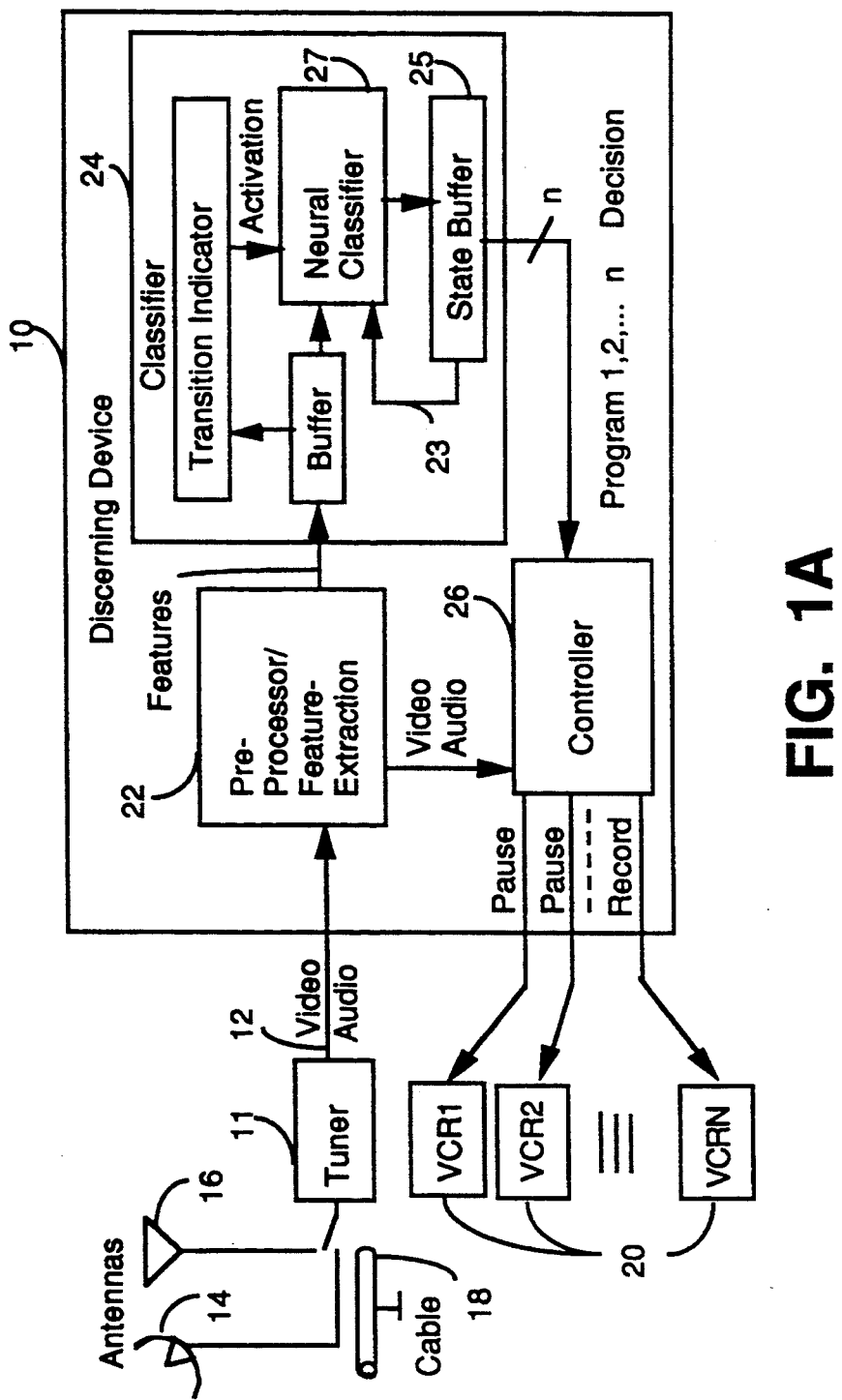
FIG. 1A is a block diagram of the present invention to classify programs and commercials based on audio and video television broadcast signals.
Figure 2:
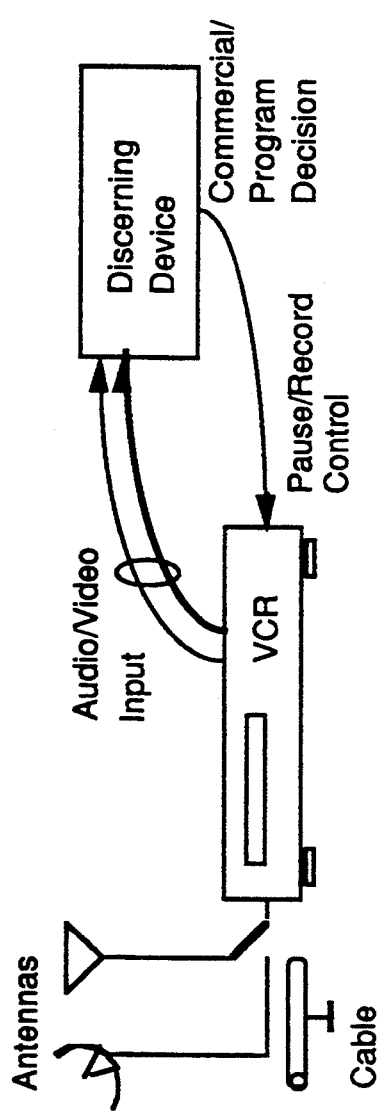
FIG. 2 is a block diagram showing the way to eliminate commercials during the recording of audio and video signals on the magnetic tapes of VCRs.

An important aspect in the method of the present invention is the use of an artificial neural network or discerning device 10 to classify signal patterns, and learn to modify the behavior of such network in response to changing environments, to produce consistent classifications of patterns. This neural network or discerning device 10 is designed in such a way as to learn from previous experiences, to sift through noise and pattern distortion, and extract the essential characteristics of each pattern from the input signal line 12 which often contains irrelevant information, to provide a classification mechanism for patterns into classes to be stored, recorded or displayed in different storage, recording, or displaying devices. FIG. 1A illustrates an embodiment of this invention used to classify programs and commercials, and to eliminate commercial recordings on a VCR as illustrated in FIG. 2.

Broadcast audio and/or video signals are received from a variety of different sources, such as a satellite dish 14, an antenna 16, a cable 18, and/or storage and recording devices, so such signals have to be decomposed into their components by audio and video decoders. Those components will be detected and pre-processed in a pre-processor 22 to extract their essential features.

The pre-processor output 22 will be fed to the classifier module 24 for signal discerning and pattern classification. Once a pattern has been classified as belonging to a certain class, a control signal will be generated and sent to the designated storage, recording or displaying device to record, pause or fast-forward in case of a VCR 20, or to cause audio and video fade in case of a television, as illustrated schematically in FIG. 2, in case the recording device is a VCR 20.

The discerning device is made up of three modules: the pre-processor/feature extraction module 22, the classifier module 24, and the controller module 26. The means of implementation in the case of the pre-processor/feature extraction module 22 includes the use of analog circuits and digital logic (e.g., Digital Signal Processing (DSP) chips), or a combination thereof. The classifier module 24 can be implemented using DSP chips, or more specialized chips, such as fuzzy controllers or other neural network-type chips.

The preferred implementation for this invention is to use analog circuits implementation for the pre-processor/feature extraction module 22, and the DSP implementation for the classifier module 24.

Pre-processor/Feature Extraction

The purpose of this module 22 is to extract efficiently the relevant information or features for the classification task by pre-processing the audio and video signal output of a signal source such as a tuner or a VCR 11 into a data stream of features. Module 22 has the audio frequency spectra divided into a number of bands, and the video is divided into a number of spacial areas per frame, depending on performance required. Features are measured by several parameters of the input signals, such as amplitude, including: minimum, maximum, mean and the median amplitude, and the variance and the standard deviation of each feature of a feature vector. The features and their parameters include the following:

1. Audio signal: changes in power or amplitude over the frequency spectrum between program and commercial segments;
2. Chrominance signal: changes in color saturation between program and commercial segments;
3. Luminance signal: changes in brightness between program and commercial segments;
4. Vertical Interval Time Code (VITC) signal: differences in VITC transmission between programs and commercials;
5. Close-Caption (CC) signal: differences in CC transmission between programs and commercials;
6. Color carrier jitter signal: transitions between programs and commercials due to the creation of color carrier phase jitter;
7. Signal to Noise Ratio (SNR) signal: changes (SNR) between program and commercial segments based on their SNR.

Figure 1B:
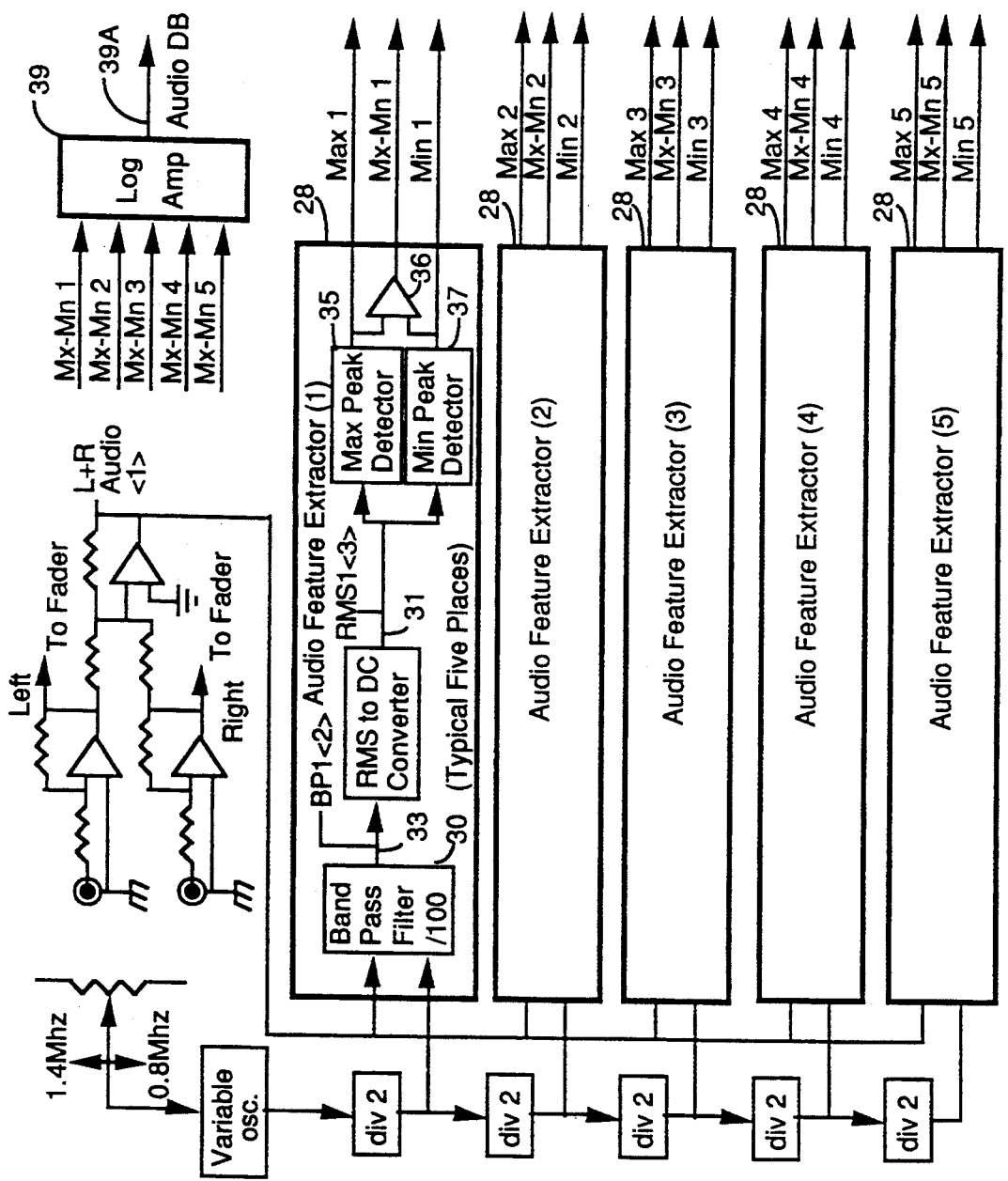
FIGS. 1B-1F are detailed schematic diagrams of each module of the discerning device, FIGS. 1B and 1C illustrating audio and video components of the pre-processor/feature extraction module, respectively, FIGS. 1D and 1E illustrating a neural classifier and its digital representation, respectively, and FIG. 1F illustrating the schematic representation of the controller.

The audio feature extractor of abstractor 22 provides the evaluation of the incoming summed Left and Right <1> audio signal from input line 12 by filtering it into several frequency bands, and extracting relevant features for each frequency band of interest, as illustrated in FIG. 1B.

Audio Processor

The audio processor contains basic feature extractor circuitry which is used with each frequency band of interest. In this example, there are five bands 28, each of which is twice center frequency of the previous band, i.e., 375 Hz, 750 Hz, 1500 Hz, 3000 Hz, 6000 Hz. Each band 28 is extracted using a band pass filter 30, with one of the center frequencies listed above. The band pass filters 30 are of a switched capacitor type, so changing the sample clock frequency would allow other center frequencies such as 250, 500, 1000, 2000, and 4000 Hz or 400, 800, 1600, 3200 and 6400 Hz.

The feature extractor is replicated for each of the five frequency domains of interest. One is described below:

L+R audio <1> is the input signal to the band pass filter along with a clock/2 signal. Clock/2 divided by 100 sets the center frequency of the first band pass filter 30. Clock/2 can be adjusted from 400 KHz to 700 KHz, giving a center frequency of 4 KHz to 7 KHz. In this instance, the clock/2 signal is set for 600 KHz yielding a 6 KHz center frequency. The output of the band pass filter BPaudio1 <2> 33 is RMS to DC converted, giving a root mean square value of the audio signal at location 31, FIG. 1A. RMSaudio1 <3> is fed to a pair of peak detectors 35 and 37, one for positive and one for negative, providing the maximum [MAX B1] and minimum [MIN B1] DC value of the RMSaudio1 for the various bands of processor 22. A summing amplifier 36 subtracts the minimum from the maximum, giving a [MAX−MIN1] of the RMSaudio1 value for the frequency bands. The five MAX−MIN signals are fed to a summing log amp 39 to provide the [Audio DB] signal 39a.

The video feature extractor has composite video for its input and a multiplicity of derived signals for outputs. By means of appropriate filtering, including band pass filter 37a and low pass filter 39 and processing the composite video <1> signal on line 41 (FIG. 1C) is separated into Chrominance (C) and Luminance (Y) components for further processing, as illustrated in FIG. 1C.

Chrominance Processor

Figure 1C:
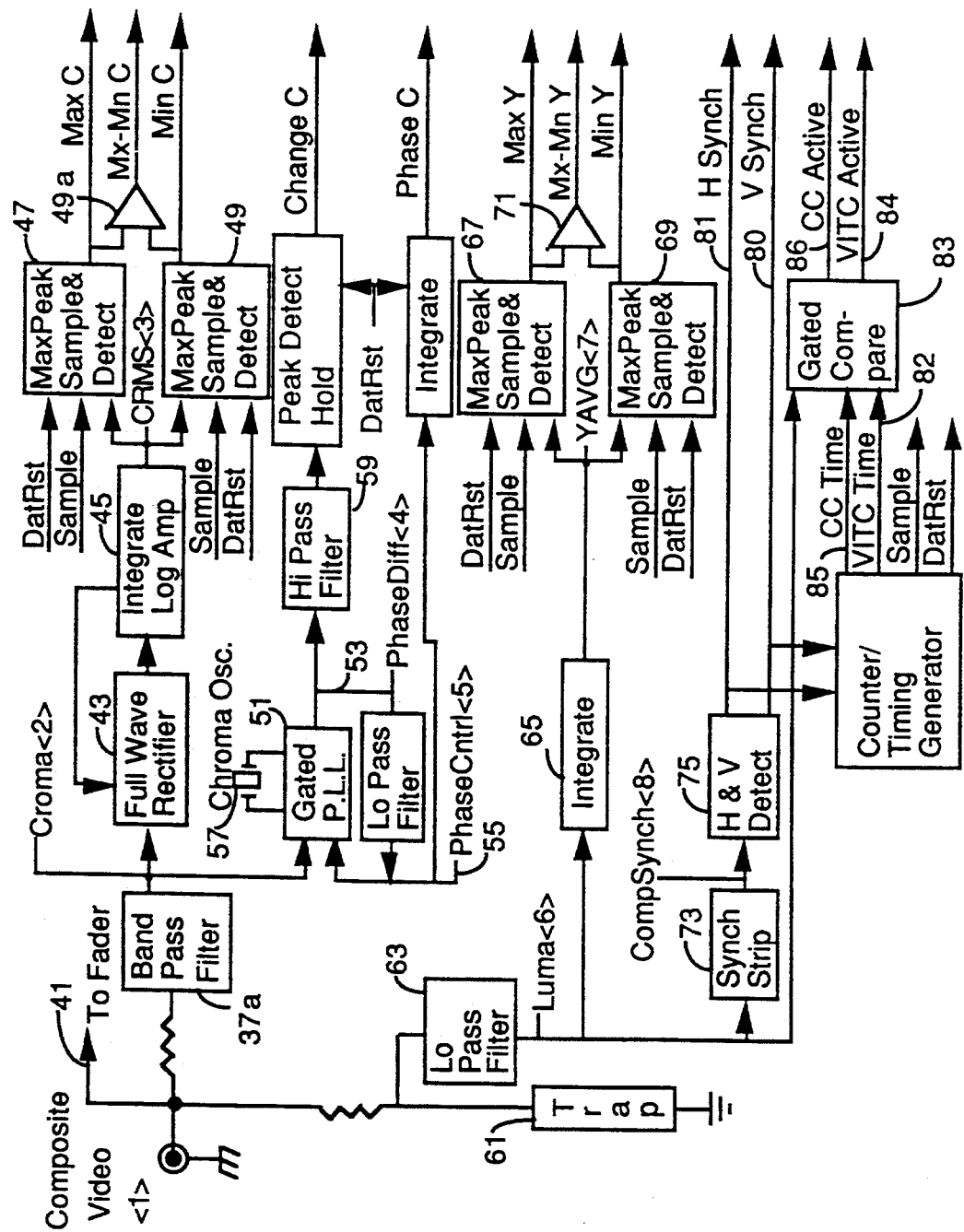

The chroma signal <2> is derived from the composite video input through a chrominance band pass filter 37a (see FIG. 1C). A full-wave rectifier 43 and log/amp integrator 45 provide the chroma RMSC <3> DC value. A pair of peak detectors 47 and 49, one for positive and one for negative, provide the maximum [MAX C] and minimum [MIN C] DC value of the chroma signal. The peak detectors sample RMSC during a sample interval, and are reset to zero at detector reset [DetRst] time. A summing amplifier 49a subtracts the minimum from the maximum giving a [Max−Min] of the RMS DC chroma value. The peak detectors and amplifier may be replicated to provide different picture vectors, i.e., top, middle and bottom of the video frame. Each replicated group would have a different [sample] time interval signal.

Chroma is also input to a gated phase-locked loop 51 (FIG. 1C) which compares the chroma phase with the phase of a crystal oscillator 57 running at chroma frequency. The phase difference PhsDif <4> on line 53 signal is low-pass filtered to derive phase control signal, PhsCtrl <5> 55, and fed back to the VCO input of the PLL. PhsDif is further processed by a high-pass filter 59. The high-pass filter detects significant changes in chroma relative the oscillator. PhsCtrl is processed by an integrator to derive the chroma phase state [Phase C].

Luminance Processor

Composite video is passed through a chroma trap 61 and low-pass filtered by filter 63 to derive Luma <6>. Luma is integrated by integrator 65 to provide the average DC value AvgY <7>. A pair of peak detectors 67 and 69, one for positive and one for negative, provide the maximum [MAX Y] and minimum [MIN Y] DC value of the luma signal. The peak detectors sample AvgY during sample interval, and are reset to zero at detector reset [DetRst] time. A summing amplifier 71 subtracts the minimum from the maximum giving a [Max−Min] of the average luma value. The peak detectors and amplifier may be replicated to provide different picture vectors, i.e., top, middle and bottom of the video frame. Each replicated group would have a different [Sample] time interval signal.

Sync Processor/Timing Generator

Luma is stripped of all but synchronizing signals in the sync stripper 73 (FIG. 1C). Composite sync CmpSync <8> is fed to the H&V detector 75 which provides the system timing signals [V Sync] and [H Sync] on lines 80 and 81. H Sync and V Sync are inputs to the timing generator which counts V and H sync pulses to derive the appropriate time intervals for resetting the detectors and integrators [DetRst] for sampling the chroma and luma information [Sample], for detecting Vertical Interval Time Code data [VITC time], and Closed Caption data [CC time].

VITC Time on line 82 enables a comparator 83 to look for VITC data and, if detected, outputs [VITC Active] on line 84. CC Time on line 85 enables gates comparator 83 to look for Closed Caption data and, if detected, outputs [CC Active] on line 86.

Classifier

The input to the network classifier consists of a sequence of feature vectors extracted using the preprocessor/feature extraction module as described above. These feature vectors contain information about chroma/lumina, audio spectrum, VITC, close-caption, color carrier jitter, and signal-to-noise ratio data. In all, each feature vector contains k indicators (approximately 60–100 analog indicators) scaled to a range of +1 to −1. The feature vector is generally defined as the vector F(t).

These features are sampled, analog to digital converted and passed to the input of the network at a rate of 1–60 per second, depending on the speed required for pattern classification. The total input to the network classifier consists of the buffered sequence F(t), F(t-s), F(t-2s), ... F(t-ns), where s is the sampling interval in seconds, and n is the number of samples. Thus, the network sees the last (n+1) feature vectors representing a window of several seconds. The total number of inputs to the network is equal to the number of samples (n+1), multiplied by the number of indicators k in the feature vectors.

A state buffer 25 (FIG. 1A) a means for storing past decisions, is coupled to the output of neural classifier 27 of classifier 24. Feedback means 23 is provided to couple an output of state buffer 25 to neural classifier 27 to allow such decisions to be used to determine which of the signal groups the signal segments. An additional input to the neural classifier is the current state of the system: +1 if the apparatus is currently recording a program, and −1 if no recording is taking place. This additional input may be thought of as the previous decision of the classifier made at the previous transition (or, instead, several previous decisions).

Figure 1D:
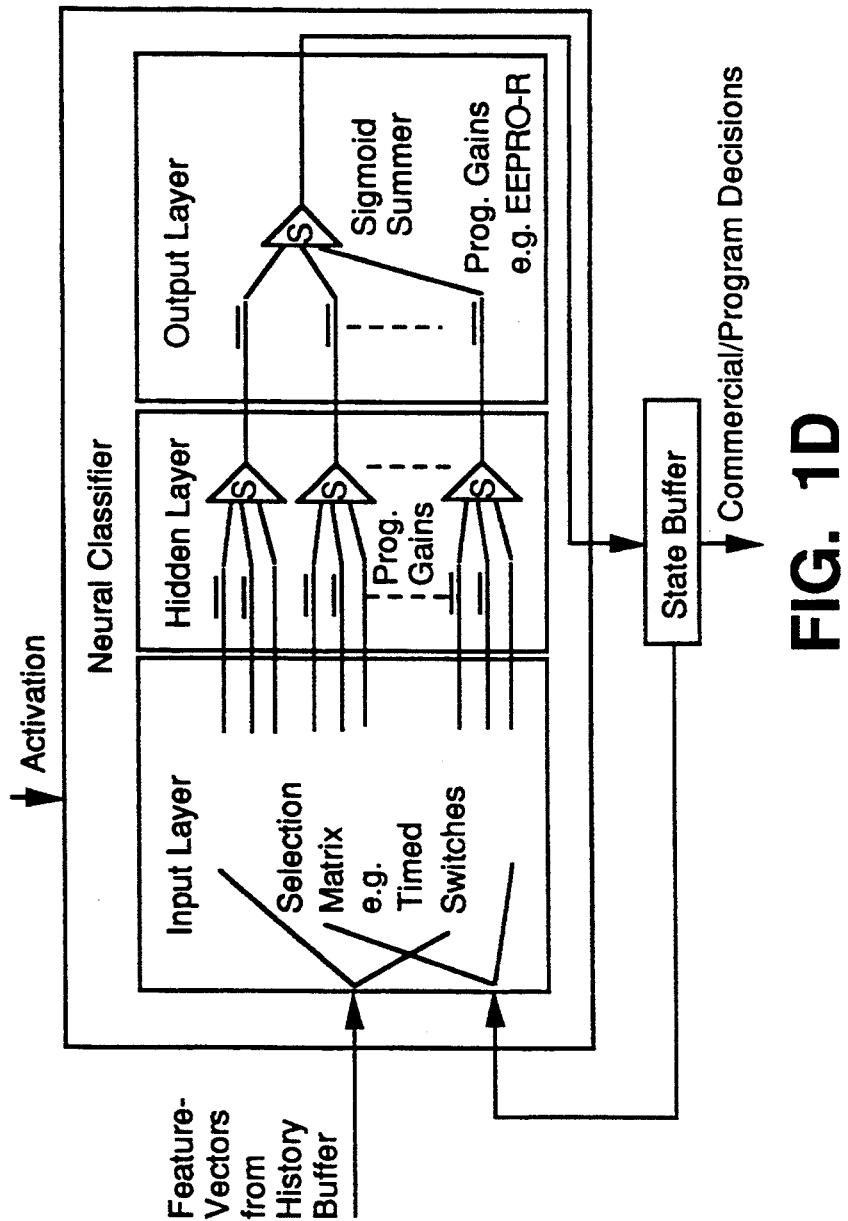

A multi-layer neural network is shown in FIG. 1D. It is comprised of a layered arrangement of artificial neurons in which each neuron of a given layer feeds all neurons of the next layer. The inputs to a neuron are multiplied by various coefficients called weights, which represent the synaptic connectivity between a real neuron in biology in a specific layer and another neuron in the following layer. All weighted inputs to a neuron are added, and the result is "compressed" by a sigmoid function (e.g., Arctanh), as illustrated in FIG. 1D.

Training of the artificial neural network is accomplished using the backpropagation algorithm in which a set of inputs are associated with a set of desired output, and the weights are iteratively adapted to achieve the desired mapping. In the classifier, the value of an output node converges to the probability of being in a class given the input.

The network will consist of multiple layers (e.g., three layers as in FIG. 1D) of synaptic weights and of several hundreds to several thousands of inputs feeding hidden neurons, feeding to 1 output (the number of inputs and hidden neurons may vary slightly, as they will be optimized during training). The single output of the network is used to make a decision as to whether the broadcast is either a commercial or a program, following a detected transition. The output neuron level indicates the posterior probability of the broadcast being a program given the input minus the posterior probability of the broadcast being a commercial given the input.

Ideally, the output should equal +1 for a detected program, and −1 for a detected commercial. A threshold of zero is used to make a decision as to whether a program or a commercial is indicated. (Other thresholds may be used to adjust the risk associated with making incorrect decisions. For example, it is less serious to make the mistake of recording a commercial than it is to make the mistake of not recording a program.) The final commercial/program decision is made based on the consistency of the network output for several consecutive clock cycles. This is necessary to avoid spurious decisions immediately following a transition. The final decision converts the decisional index into a program decision, where program decision is a decision among classes of programs including commercials.

In the preferred implementation, the Digital Signal Processor (DSP) based classifier has as its input the feature signals or vectors from the feature extractor, and the parameter values from the EPROM (or EPROM or PROM) memory. Its output is a signal, classifying the feature contents as commercial or program. It provides this functionality by controlling a multiplexed analog to digital converter to gain digital equivalents of the feature vectors, and then processing them in accordance with the parameter values held in external memory.

Figure 1E:
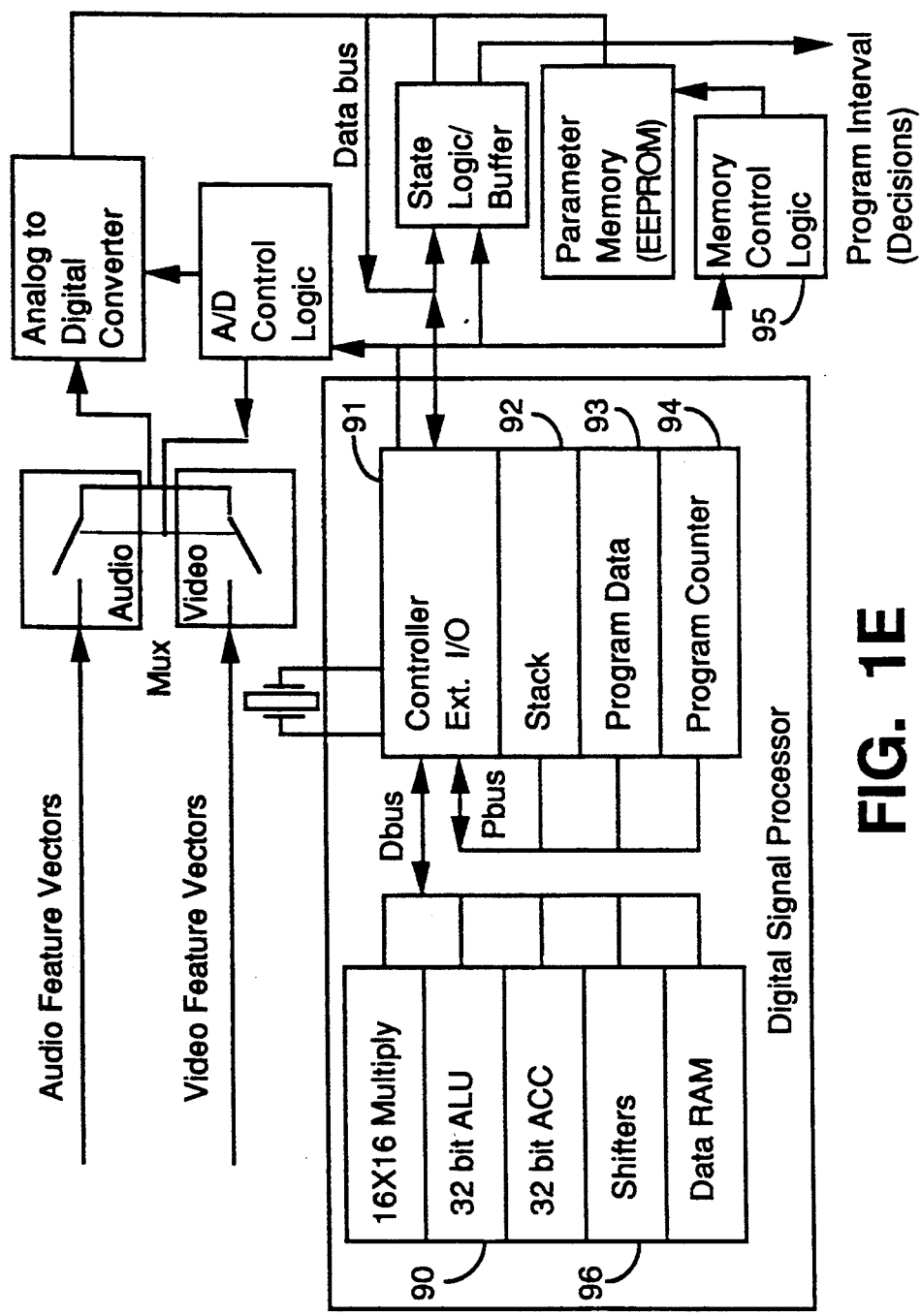

The digital neural classifier presented in FIG. 1D is implemented using DSP chips, as illustrated in FIG. 1E. All indicators of the feature vector audio, video and state are input to the DSP memory (e.g., Data RAM) over the data bus, as illustrated in FIG. 1E. Only audio and video feature vector indicators are fed through the analog-to-digital (A/D) converter. All indicator values are then multiplied by the appropriate weights, and added together in groups corresponding to neurons in the hidden layer, and finally "compressed" with a sigmoid function (e.g., Arctanh). The results of these computations are the output values of all the neurons on a layer. This same process is repeated for each hidden layer. The last layer is the output layer that produces the value in the state/logic buffer, as illustrated in FIG. 1E.

The multiplication of a weight is accomplished by using the 16×16 multiplier, and the additions are carried out by the 32-bit accumulator 90, as illustrated in FIG. 1E. The weights are stored in the parameter memory (e.g., EEPROM or ROM).

The central logic (controller ext. I/O) 91 with the aid of the stack 92, program data memory 93, program control 94, 32-bit ALU 90, memory control logic 95, and shifters 96 coordinate all these activities: inputs, neural computations, and outputs, as illustrated in FIG. 1E. In higher performance implementations, more of these activities will occur concurrently, in order to make optimized use of resources.

Controller

Figure 1F:
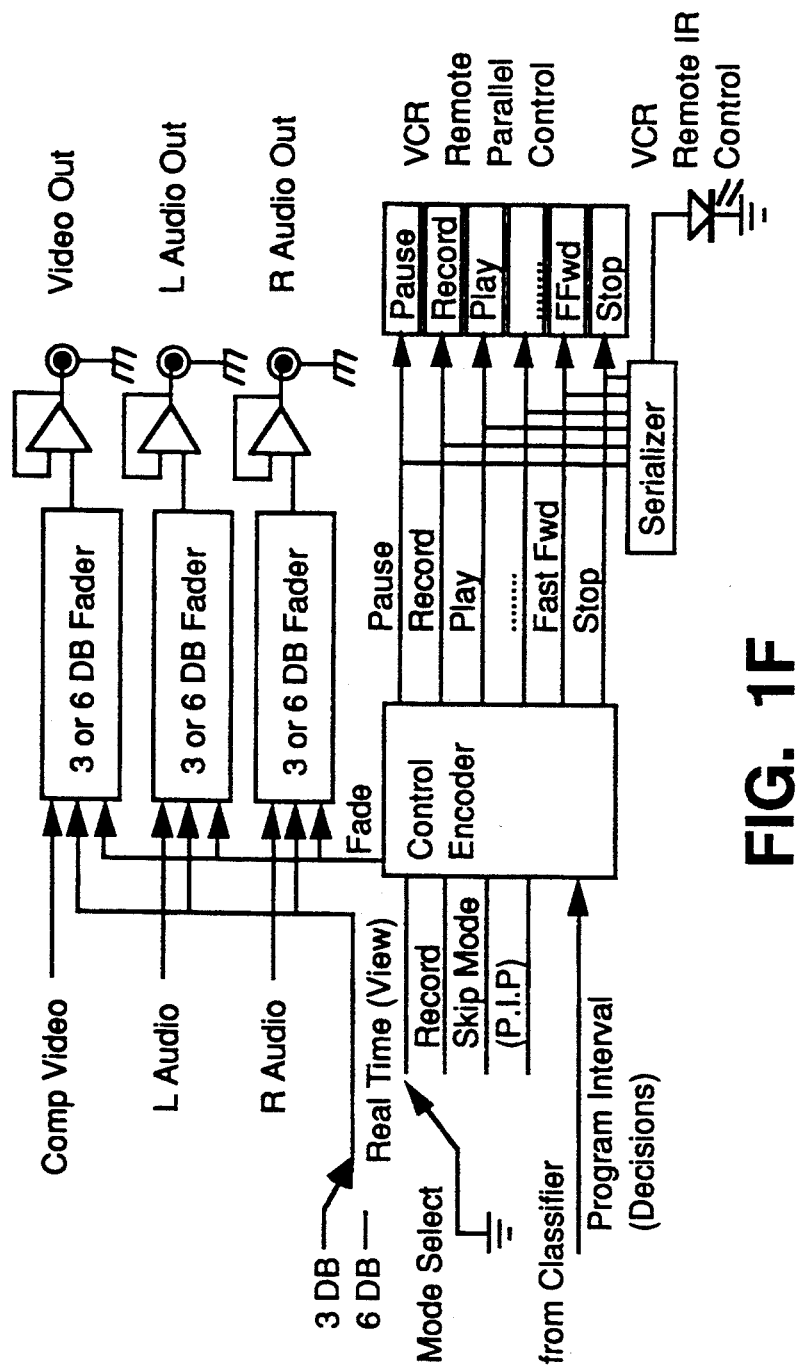

The controller used in this invention includes several remote control protocols that are in commercial use to control a large number of consumer and professional VCRs. A schematic representation of the controller is shown in FIG. 1F.

The controller provides the interface between the external devices and the internal logic. The controller has as inputs the [Program Decision] signal from the classifier, and the user selected mode control inputs, such as [View], [Record], [Skip] and [PIP], where PIP stands for Picture-in-Picture, which is available on certain televisions.

Controller Interface

The control encoder provides the logic to control the fader, PIP and VCR operation modes. The serializer encodes the VCR control signals to a format suitable for controlling a VCR, using the IR remote control interfaces.

If the mode selected is [View], then the program index signal causes the fader to be inactive. During commercial periods, the fader causes the [L audio and R audio out] and [video out] to be attenuated by 3 or 6 DB depending on the setting of the fader switch. If [Record] mode is selected, the program index signal activates the record signal sent by the controller to the appropriate VCR. During commercials, the pause signal is active. In [Skip] mode, the play signal is activated during a program, and Fast Forward is activated during a commercial. In [PIP] mode during a commercial, the current channel image and sound get relegated to the small picture.

A variety of configurations can be connected together depending on the intended use. The pattern classification and controlling of the storage, recording or displaying devices can be formed into a wide variety of configurations, including different varieties of audio and/or video sources, receiving devices, and recording, storage and displaying devices. The various configurations may be formed by connecting different combinations of audio and/or video signal sources, receiving devices, and storage, recording or display devices.

FIG. 2 schematically illustrates the invention with a VCR as a receiving and recording device.

Figure 3:
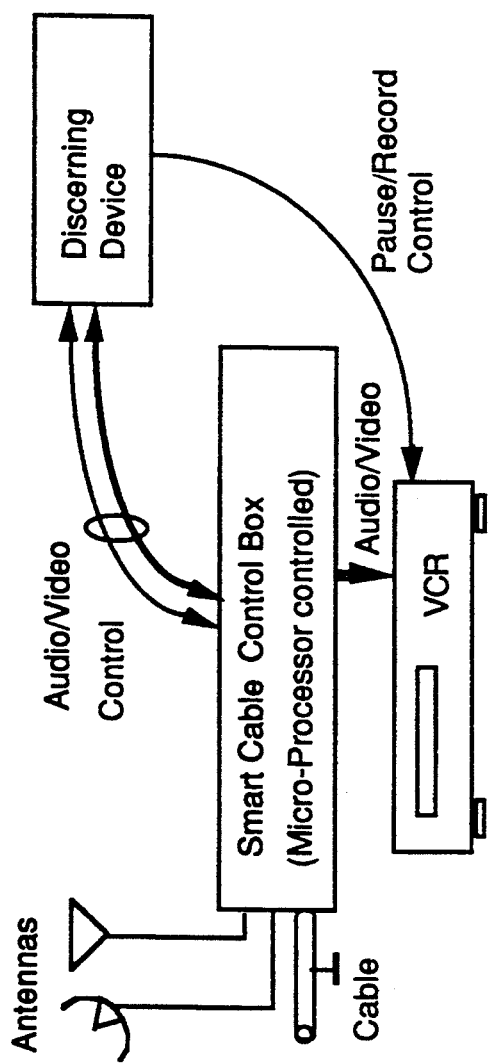
FIG. 3 is a block diagram illustrating a smart cable control box controlled by microprocessors.

FIG. 3 is a block diagram showing the use of the present invention with a smart cable control box (microprocessor).

Figure 4:
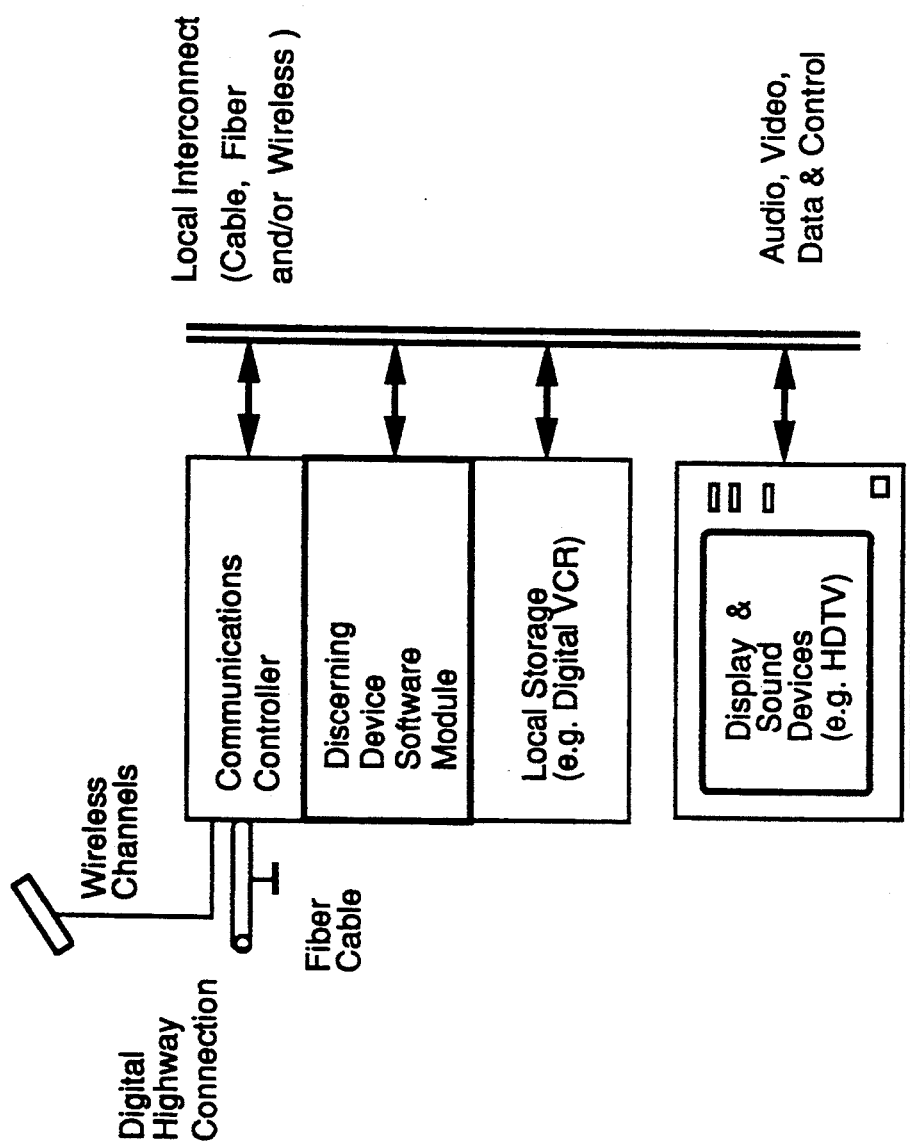
FIG. 4 is a block diagram illustrating an imbedded software module in a smart cable control box, connected to future digital highway interconnect architecture.

FIG. 4 is a block diagram showing the use of the present invention with a future digital highway interconnected architecture.

Figure 5:
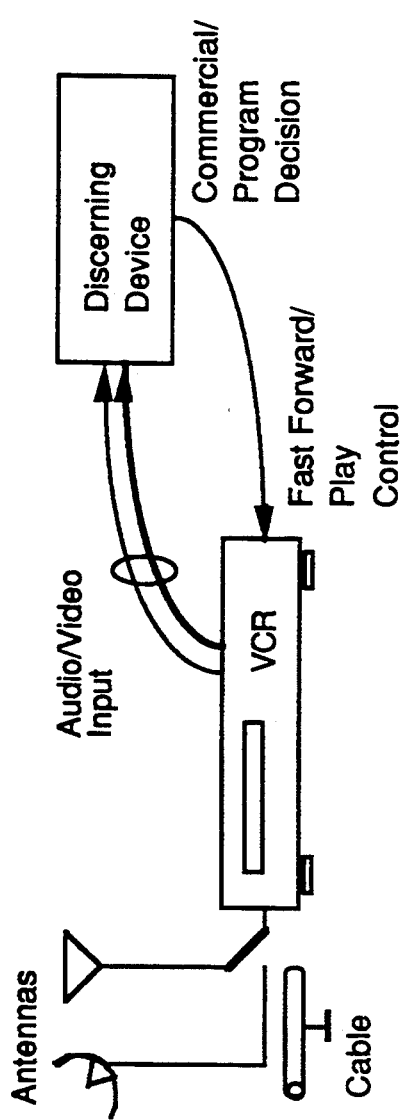
FIG. 5 is a block diagram illustrating a VCR as a playing device for pre-recorded programs.

FIG. 5 is a block diagram showing the use of the present invention with a VCR as a playing device for pre-recorded programs that include commercials.

Figure 6:
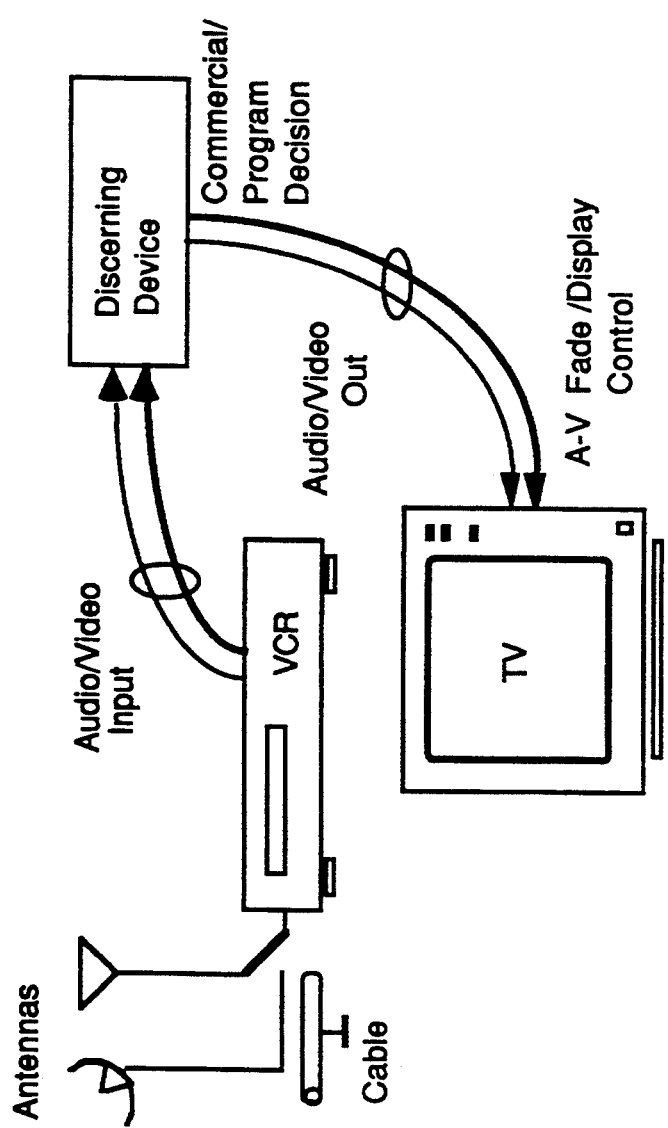
FIG. 6 is a block diagram illustrating a VCR as a receiving device and a television as a displaying device for television broadcast signals.

FIG. 6 is a block diagram showing the use of the present invention with a VCR as a receiving device and a television as a displaying device.

Performance of the method of the present invention will depend on the degree with which the discerning device will be able to discriminate between different classes of patterns, as well as the number of classes the device is required to classify among all classes.

While the invention has been described above primarily in the context of classifying patterns of programs and commercials based on audio and video television broadcast signals, this should be considered to be merely an illustration of a typical use of the method.

It will be evident to those skilled in the art that there are numerous embodiments of this invention which, while not expressly set forth above, are clearly within the scope and spirit of the invention. Therefore, the above description is to be considered exemplary only, and the actual scope of the invention is to be defined solely by the appended claims.

What is claimed is:

1. Apparatus for processing electromagnetic signals capable of being separated into a first group and a second group comprising:

means for receiving said signals as a signal stream;

means coupled with the receiving means for forming the signal stream into segments which can be represented as parameters, with the groups being mixed together;

means coupled with said forming means for storing the signal parameters after they have been formed;

means coupled with said storing means for classifying the segments into the first and second groups, said classifying means being operable to generate at least one decisional index representative of at least one signal segment and its parameters of at least one of the said groups of signals;

means for storing past decisions and for coupling the last-mentioned storing means to the classifying means to allow such past decisions to be included in the classifying decisions to determine which signal groups the signal segments belong to; and a signal controller coupled with the classifying means for receiving and being responsive to a decisional index therefrom, said controller being operable to control a signal sensitive structure adapted for directing and transforming said groups of signals to respective end use locations.

2. Apparatus for processing signals as set forth in claim 1, wherein said first group of signals includes program signals and the second group of signals includes commercial signals.

3. Apparatus as set forth in claim 1, wherein the means for classifying the segments includes a neural network.

4. Apparatus as set forth in claim 1, wherein is included means defining a transition indicator for coupling the storage means to the classifying means, said transition indicators being operable for actuating the classifying means to cause a decision to be made by the classifying means as to the classification of at least one signal segment, relative to said first and second groups.

5. Apparatus as set forth in claim 1, wherein is included a transition indicator means for coupling the storage means to the classifying means, said transition indicator being operable for actuating the classifying means to cause decision to be made by the classifying of each segment relative to the first and second groups.

6. Apparatus for processing electromagnetic signals representing program and commercial signals comprising:

means adapted to be coupled to a source of said signals for receiving the signals as a signal stream;
   means coupled with the receiving means for forming the signal stream into segments which can be represented as parameters, with the groups being mixed together;
   means coupled with the forming means for storing the signal parameters after they have been formed;
   a neural network coupled with said storing means and including classifying means operable to generate at least one decisional index representative of at least one signal segment and its parameters of at least one of said groups of signals;
   means defining a transition indicator for coupling the storage means to the classifying means, said transition indicator being operable for actuating the neural network to cause a decision to be made by the neural network as to the classification of at least one signal segment, relative to said program and commercial signals;
   means for storing past decisions;
   feedback means for coupling the last-mentioned storing means to the classifying means to allow such past decisions to be included in the classifying decisions to determine which of said signal groups the signal segments belong to; and
   a signal controller coupled with the neural network for receiving and being responsive to a decisional index from the neural network, said controller being operable to control a signal sensitive structure adapted for directing and transforming said groups of signals to respective end use locations.

7. Apparatus as set forth in claim 6, wherein said electromagnetic signals include audio signals, chrominance signals, luminance signals, vertical integral time code (VITC) signal, a close-captioned (CC) code signal, a color carrier jitter (CCJ) signal, and a signal to noise ratio (SNR) signal.

8. Apparatus as set forth in claim 6, wherein said audio signals are stereo signals.

9. Apparatus as set forth in claim 7, wherein the audio signals are divided into a number of bands, each band being the source of signals from which said parameters are determined.

10. A method for processing electromagnetic signals capable of being separated into a first group and a second group comprising:

receiving said signals at a location as a signal stream;
   forming the signal stream into segments which can be represented as parameters, with the groups being mixed together;
   storing the signal parameters after they have been formed;
   classifying at least one segment into the first and second groups;
   generating as a function of said classifying step at least one decisional index representative of at least one signal segment and its parameters of at least one of the said groups of signals;
   storing past decisions; and
   allowing such past decisions to be included in the classifying decisions to determine which signal groups the signal segments belong to and in response to a decisional index, controlling a signal-sensitive structure adapted for directing and transforming said groups of signals to respective end use locations.

11. A method as set forth in claim 10, wherein said first group of signals includes program signals and the second group of signals includes commercial signals.

12. A method as set forth in claim 10, wherein the classifying step includes operating at least one neural network.

13. A method as set forth in claim 10, wherein is included the step of sensing a transition in at least one signal segment from one said group to another group; and actuating the classifying means to cause a decision to be made by the classifying means as to the classification of at least one signal segment, relative to said first and second groups.

14. A method for processing electromagnetic signals representing program and commercial television signals comprising:

receiving the signals as a signal stream at a first location;
   forming the signal stream into segments which can be represented as parameters, with the groups being mixed together;
   storing the signal parameters after they have been formed;
   operating a neural network after the storing step to classify at least one signal segment and to generate at least one decisional index representative of at least one signal segment and its parameters of at least one of said groups of signals;
   sensing a transition from one group to the other group by actuating the neural network to cause a decision to be made by the neural network as to the classification of at least one signal segment, relative to said program and commercial signals;
   storing past decisions;
   allowing such past decisions to be included in the classifying decisions to determine which of said signal groups the signal segments belong to; and
   controlling a signal-sensitive structure adapted for directing and transforming said groups of signals to respective end use locations.

15. A method as set forth in claim 14, wherein said electromagnetic signals include audio signals, chrominance signals, luminance signals, vertical integral time code (VITC) signal, a close-captioned (CC) code signal, a color carrier jitter (CCJ) signal, and a signal to noise ratio (SNR) signal.

16. A method as set forth in claim 14, wherein said audio signals are stereo signals.

17. A method as set forth in claim 15, wherein the audio signals are divided into a number of bands, each band being the source of signals from which said parameters are determined.

18. Apparatus for processing electromagnetic signals representing program and commercial signals comprising:

means adapted to be coupled to a source of said signals for receiving the signals as a signal stream;
   means coupled with the receiving means for forming the signal stream into segments which can be represented as parameters, with the groups being mixed together;
   means coupled with the forming means for storing the signal parameters after they have been formed;
   a neural network coupled with said storing means and including classifying means operable to generate at least one decisional index representative of at least one signal segment and its parameters of at least one of said groups of signals;

means defining a transition indicator for coupling the storage means to the classifying means, said transition indicator being operable for actuating the neural network to cause a decision to be made by the neural network as to the classification of at least one signal segment, relative to said program and commercial signals;

the video signals being divided into a number of bands, each band being the source of signals from which characteristic numbers are determined; and a signal controller coupled with the neural network for receiving and being responsive to a decisional index from the neural network, said controller being operable to control a signal sensitive structure adapted for directing said groups of signals to respective end use locations.

19. Apparatus for processing electromagnetic signals representing program and commercial signals comprising:

means adapted to be coupled to a source of said signals for receiving the signals as a signal stream;

means coupled with the receiving means for forming the signal stream into segments which can be represented as parameters, with the groups being mixed together;

means coupled with the forming means for storing the signal parameters after they have been formed;

a neural network coupled with said storing means and including classifying means operable to generate at least one decisional index representative of at least one signal segment and its parameters of at least one of said groups of signals;

means defining a transition indicator for coupling the storage means to the classifying means, said transition indicator being operable for actuating the neural network to cause a decision to be made by the neural network as to the classification of at least one signal segment, relative to said program and commercial signals;

the chrominance and luminance signals being derived from the video signals and divided into a number of spatial bands from which several characteristic numbers can be determined; and a signal controller coupled with the neural network for receiving and being responsive to a decisional index from the neural network, said controller being operable to control a signal sensitive structure adapted for directing said groups of signals to respective end use locations.

20. A method for processing electromagnetic signals representing program and commercial television signals comprising:

receiving the signals as a signal stream at a first location;

forming the signal stream into segments which can be represented as parameters, with the groups being mixed together;

storing the signal parameters after they have been formed;

operating a neural network after the storing step to classify at least one signal segment and to generate at least one decisional index representative of at least one signal segment and their characteristic of at least one of said groups of signals;

sensing a transition from one group to the other group by actuating the neural network to cause a decision to be made by the neural network as to the classification of at least one signal segment, relative to said program and commercial signals;

storing past decisions;

allowing such past decisions to be included in the classifying decisions to determine which of said signal groups the signal segments belong to, the video signals being divided into a number of bands, each band being the source of signals from which its parameters are determined;

the chrominance and luminance signals being derived from the video signals and divided into a number of spatial bands from which several characteristic numbers can be determined; and controlling a signal-sensitive structure for directing said groups of signals to respective end use locations.

21. A method for processing electromagnetic signals representing program and commercial television signals comprising:

receiving the signals as a signal stream at a first location;

forming the signal stream into segments which can be represented as parameters, with the groups being mixed together;

storing the signal parameters after they have been formed;

operating a neural network after the storing step to classify at least one signal segment and to generate at least one decisional index representative of at least one signal segment and their characteristic of at least one of said groups of signals;

sensing a transition from one group to the other group by actuating the neural network to cause a decision to be made by the neural network as to the classification of at least one signal segment, relative to said program and commercial signals;

storing past decisions;

allowing such past decisions to be included in the classifying decisions to determine which of said signal groups the signal segments belong to; and controlling a signal-sensitive structure for directing said groups of signals to respective end use locations; and chrominance and luminance signals being derived from the television signals and divided into a number of spatial bands from which several parameters can be determined.

* * * * *